United States Patent [19]

Heymer et al.

[11] 3,956,462

[45] May 11, 1976

[54] PROCESS UTILIZING WASTE MATERIAL CONSISTING SUBSTANTIALLY OF PHOSPHOROUS ACID

[75] Inventors: Gero Heymer, Erftstadt Liblar; Wolfgang Scheibitz, Leverkusen; Hasso Spott, Turnich-Balkhausen, all of Germany

[73] Assignee: Hoechst Aktiengesellschaft, Frankfurt am Main, Germany

[22] Filed: Mar. 18, 1974

[21] Appl. No.: 451,911

[30] Foreign Application Priority Data

Mar. 22, 1973 Germany............................ 2314232

[52] U.S. Cl................................ 423/299; 423/305; 423/307; 423/317
[51] Int. Cl.²......................................... C01B 25/00
[58] Field of Search ............ 423/299, 305, 307, 317

[56] References Cited
UNITED STATES PATENTS 3,116,109   12/1963   Cummins........................... 423/299

Primary Examiner—Oscar R. Vertiz
Assistant Examiner—Gregory A. Heller
Attorney, Agent, or Firm—Connolly and Hutz

[57] ABSTRACT

Waste material consisting substantially of contaminated phosphorous acid is utilized. To this end, the phosphorous acid is introduced, with agitation into a liquid phase. Liquid phase and phosphorous acid are maintained in a ratio by volume between 1:1 and 10:1. The liquid phase is placed in a reactor, maintained between 250° and 400°C and selected from a phosphoric acid of the general formula $H_{n+2}P_nO_{3n+1}$, in which n substantially stands for a number between 1 and 5. Resulting hydrogen phosphide is removed. In the event of continuous operation, newly formed liquid phase is removed from the reactor, at the same rate as it is being formed.

14 Claims, 1 Drawing Figure

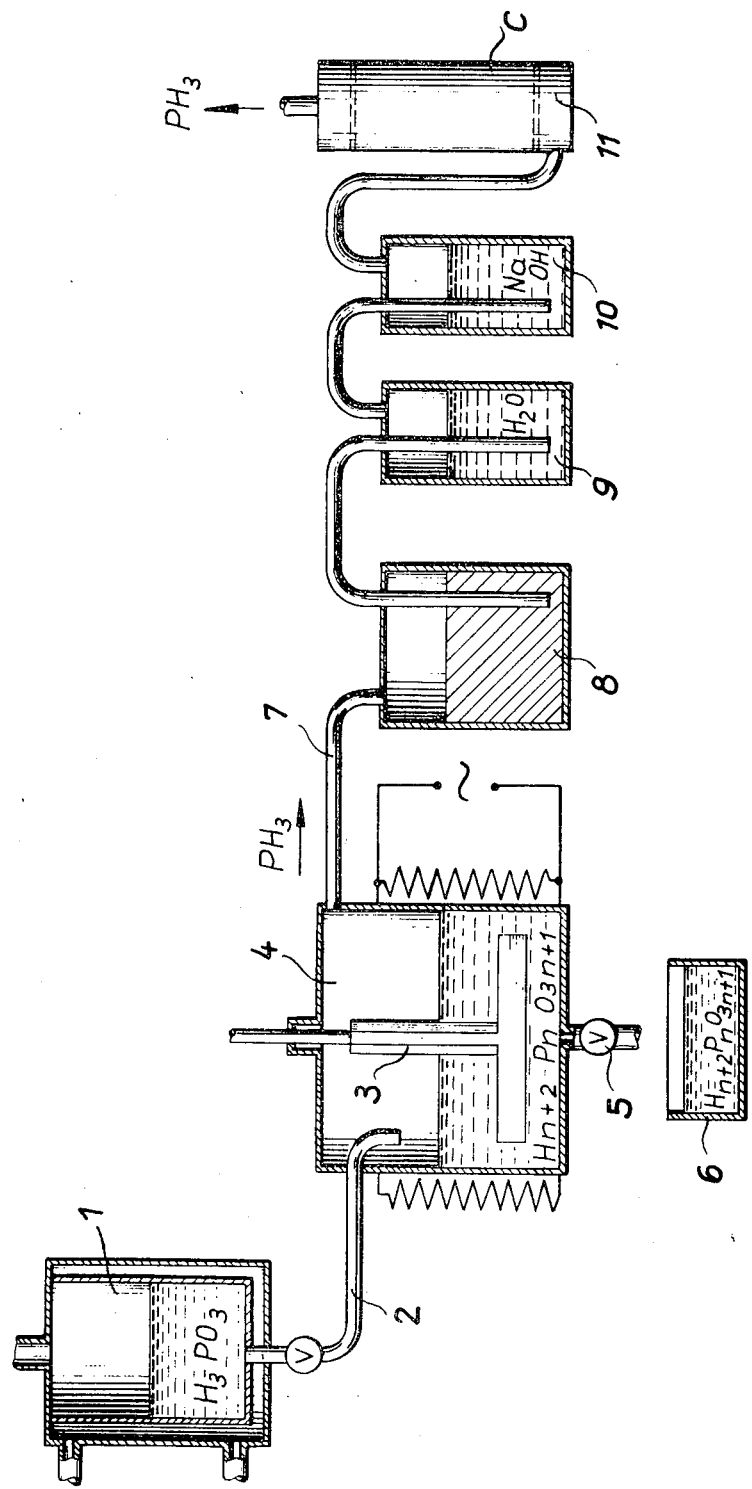

PROCESS UTILIZING WASTE MATERIAL CONSISTING SUBSTANTIALLY OF PHOSPHOROUS ACID

The present invention relates to a process utilizing waste material consisting of phosphorous acid contaminated substantially with organic compounds, and to an apparatus for carrying out this process.

Phosphorous acid is a by-product which is obtained in various commercial processes, for example in the chlorination of fatty acids.

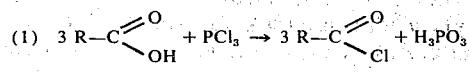

The waste acids are so strongly contaminated that they are normally regarded as useless waste, the disposal of which is a problematic and costly procedure. Depending on their origin, the waste acids are yellow to redbrown sirupy melts of $H_3PO_3$ or $H_4P_2O_5$, which partially contain solid matter, have a strong smell and which are strongly contaminated with variable proportions of organic compounds, HCl, $PCl_3$ and $POCl_3$.

It has already been described that pure crystallized $H_3PO_3$ can be decomposed pyrolytically under certain conditions, for example in accordance with the following reaction scheme:

$$4 H_3PO_3 \rightarrow 3 H_3PO_4 + PH_3 \quad (2)$$

To avoid the costs which are incurred by the disposal of contaminated $H_3PO_3$, it is highly desirable to utilize the waste acid. This has already been suggested, for example in DT-PS 1 224 281, which describes oxidizing the waste material by means of a flame fed with elementary phosphorus and an excess of oxygen. More particularly, all of the phosphorus present is converted at high temperatures to the $P_4O_{10}$ stage of oxidation and the organic impurities are simultaneously burnt quantitatively to $CO_2$ and $H_2O$. In this process, it is naturally possible for the waste to be disposed of free from residues and for the phosphorus to be recovered. Despite this, the fact remains that the value of phosphorus is potentially impaired by the conversion of the overall quantity of phosphorus from the relatively valuable trivalent stage of oxidation to the less valuable pentavalent stage of oxidation.

DT-AS 2,204,929 describes a further process, which provides for the phosphorus to be maintained in the trivalent positive valence stage and for the $H_3PO_3$ to be purified. The steps necessary to achieve this are, however, relatively expensive and residual waste material containing more or less $H_3PO_3$ continues to be formed, which has to be disposed of.

In accordance with the present invention we now provide a process permitting the residue-free utilization of waste material containing $H_3PO_3$ and the simultaneous recovery of phosphorus in the form of valuable compounds.

The process of the present invention comprises more particularly introducing phosphorous acid, with agitation, into a liquid phase so as to maintain a ratio by volume of liquid phase to phosphorous acid between 1:1 and 10:1, preferably about 2:1, the liquid phase being placed in a reactor, being maintained at temperatures between 250 and 400°C, preferably between 300° and 350°C and being selected from at least one phosphoric acid of the general formula $H_{n+2}P_nO_{3n+1}$, in which $n$ substantially stands for a number between 1 and 5; removing resulting hydrogen phosphide and — in the event of continuous operation — removing newly formed liquid phase from the reactor, at the same rate as it is being formed.

Prior to reacting the phosphorous acid, it should conveniently be freed from volatile contaminants by passing a stream of gas therethrough.

It is equally advantageous for phosphorous acid containing more than 67 weight % of $P_2O_3$, which originates from the pyrophosphorous acid present therein, to be diluted with water so as to reduce its $P_2O_3$ content down to 67 weight %, and for the acid so treated to be reacted.

The preferred liquid phase is a polyphosphoric acid containing between about 80 and 85 weight % of $P_2O_5$ and consisting substantially of pyrophosphoric acid and minor proportions of ortho-, tris-, tetra- and pentaphosphoric acids.

The resulting hydrogen phosphide can be purified by scrubbing it with water and/or sodium hydroxide solution and/or passing it through active carbon, if desired.

The agitator should rotate at a peripheral speed between 0.01 and 10.0 m/sec., preferably about 0.1 m/sec. It has also been found advantageous for the phosphorous acid to be heated to temperatures within the range 60° to 100°C, preferably 80° to 90°C, prior to reacting it, and for the reaction to be carried out under inert gas.

An exemplary apparatus for carrying out the process of the present invention is shown diagrammatically in the accompanying drawing.

As can be seen, the apparatus comprises a heatable dose feeding means 1, a conduit 2 connecting the dose feeding means 1 to a heatable, gas-tight reactor 4 provided with an agitator 3, an outlet 5 terminating in a collecting tank 6, and an off-gas outlet 7.

It is possible for the off-gas outlet 7 to be series-connected to at least one gas scrubbing means 8, 9, 10 or 11, the latter being filled with packing material or water or sodium hydroxide solution or active carbon.

To avoid corrosion, the reactor 4 and agitator 3 should preferably be lined or coated with graphite.

The process of the present invention has been found to permit the continuous or discontinuous transformation of practically useless contaminated $H_3PO_3$ under optimum conditions, free from residues, into other valuable and pure phosphorus compounds, namely into hydrogen phosphides and orthophosphoric acid and — depending on the reaction temperature selected — into mixtures of polyphosphoric acids, which are obtained in very good yields.

As compared with the $H_3PO_3$ feed material, the resulting $PH_3$, in which the phosphorus is in the trivalent negative valence stage, is a highly valuable reaction product. The same is true concerning the resulting phosphoric and polyphosphoric acids which find widespread uses.

Under the conditions selected for the process of the present invention, the organic impurities are extensively decomposed. More particularly, they are cracked to short chain hydrocarbons of very limited reactivity, which are inert gas companions of $PH_3$. These substances, e.g. ethane, butane and similar gases, commonly do not interfere with the uses of the $PH_3$.

We have also unexpectedly discovered that it is possible for various undesirable side reactions, which occur together with the reaction of equation (2) and which produce further hydrolysis products, such as $H_2$ and solid hydrogen phosphide — these impair and reduce the yield of desirable material — to be completely avoided in the present process, in favor of the reaction of equation (2) hereinabove. As shown, e.g. in the following reacting scheme (3)

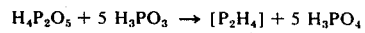

reactions competitive with respect to reaction (2) have been found to occur in all those cases in which the $H_3PO_3$ to undergo reaction contains proportionate shares of diphosphorous acid, or in which $H_4P_2O_5$ is permitted to form during the reaction. In the end, these higher hydrogen phosphides are converted to unreactive, undesirable solid hydrogen phosphides which impair the yield of $PH_3$. The following reaction scheme (4)

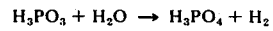

is illustrative of further competitive reactions which take place in all those cases in which the $H_3PO_3$ to undergo reaction contains an excess of $H_2O$, or in which $H_2O$ is permitted to form during the reaction. This again causes loss of $PH_3$, and the concentration of $H_2$ in the $PH_3$ gas stream is reduced. In other words, the present process transforming waste material in very simple and economic manner into valuable phosphorus compounds is based on the recognition of the phenomena illustrated in reaction schemes (3) and (4).

The resulting $PH_3$ gas has been found to contain approximately 1 to 3 % by volume of $H_2O$, 1 to 5 % by volume of $H_2$, 0 to 5 % by volume of CO and minor proportions of lower hydrocarbons, such as methane, ethane, propane, butane, propenes and butenes, as well as $H_2S$ and HCl. These, however, are impurities which are easy to remove by scrubbing with water.

The phosphoric acid obtained in the present process is a viscous colorless liquid which contains approximately 80 weight % of $P_2O_5$. Chromatographical analysis has shown that it contains $H_4P_2O_7$ as its principal constituent together with minor proportions of $H_3PO_4$ and of tris-, tetra- and pentaphosphoric acids. Its carbon content (based on 100 % $P_2O_5$) is less than 0.1 weight %. The acid could not be found to contain further impurities, at least in all those cases in which the starting material was free from contaminants nonvolatile at reaction temperature, such as iron, chromium and nickel or further metal contaminants. The vessels used for purifying the $PH_3$ were practically free from phosphorus. In other words, 100 % of the crude material was found to have been transformed into useful products.

EXAMPLE 1

Contaminated $H_3PO_3$, which originated from the chlorination of lauric acid, was used as a partially viscous, solid matter-containing starting material. It contained 106 weight % of $H_3PO_3$ (i.e. approximately 50 % of the phosphorus was in the form of $H_4P_2O_5$) and 2 weight % of carbon in the form of organic compounds, and had an orange to brown coloration. After scavenging with $N_2$ to remove volatile contaminants, the acid was diluted with water to reduce the $H_3PO_3$ content down to 100 %. The crude acid was preheated to 100°C and 4.075 kg thereof was introduced within 4 hours into a 2 liter graphite vessel, which was scavenged with $N_2$. The material was agitated by means of a graphite agitator rotating at a peripheral speed of approximately 0.1 m/sec. The vessel also contained 1 liter of phosphoric acid (approximately 80 weight % of $P_2O_5$). The temperature was 350°C. The resulting liquid final product, which was a colorless mixture of phosphoric acids clear as water, was collected in a graphite crucible. The final product contained approximately 80 weight % of $P_2O_5$ and less than 0.1 weight % of carbon based on $P_2O_5$. After deduction of the $P_2O_5$ first introduced into the graphite vessel, the yield of $P_2O_5$ was determined and found to be 76.3 weight %, based on the phosphorus used, or 101.8 % of the theoretical, based on equation (2) hereinabove. In addition to this, 23.7 weight % of the phosphorus used was recovered in the form of $PH_3$; this corresponded to a yield of 94.8 % of the theoretical, based on equation (2). Less than 0.1 weight % of the phosphorus used was found to have been retained in a separator free from liquid, and in two scrubbing vessels charged with $H_2O$ and NaOH, respectively. The reaction product was subjected to gas-chromatographical analysis and found to contain approximately 90 % of $PH_3$, approximately 5 % of $H_2$, approximately 1 % of CO, approximately 3 % of $H_2O$ and approximately 2 % of hydrocarbons, such as methane, ethane, butene and similar materials.

It was possible for the gas so produced to be used for making organic P-compounds, without difficulty.

EXAMPLE 2

Contaminated $H_3PO_3$, which originated from the chlorination of pivalic acid, was treated in a manner analogous to that described in Example 1. The acid, which contained 105 weight % of $H_3PO_3$, was scavenged and diluted with $H_2O$ so as to reduce the $H_3PO_3$ content down to 100 weight %. The acid was used at a rate of 4.110 kg/4 hrs and the temperature was 350°C. The resulting phosphoric acid mixture contained 88.5 weight % of $P_2O_5$. $P_2O_5$ was obtained in a yield of 77.5 weight %, based on the phosphorus used (this corresponded to 103.4 weight % of the theoretical) and $PH_3$ was obtained in a yield of 22.5 weight %, based on the phosphorus used (this corresponded to 90 weight % of the theoretical). The gas had a mean composition substantially the same as that indicated in Example 1, save that it contained the hydrocarbon fractions, e.g. methane, ethane, butene and similar materials, in proportions different from those indicated in Example 1. The analytical data determined for the phosphoric acid mixture corresponded to those indicated in Example 1.

We claim:

1. A process for the production of hydrogen phosphide and phosphoric acid, including polyphosphoric acid, comprising the steps of introducing waste phosphorous acid contaminated with substantially organic compounds, with agitation, into a liquid phase so as to maintain a ratio by volume of liquid phase to phosphorous acid between 1:1 and 10:1, the liquid phase being placed in a reactor, being maintained at temperatures between 250° and 400°C and being selected from at least one phosphoric acid of the general formula $H_{n+2}P_nO_{3n+1}$, in which n substantially stands for a number between 1 and 5 removing and recovering the resulting hydrogen phosphide and recovering the newly formed liquid phase containing phosphoric acid from the reactor.

2. The process as claimed in claim 1, wherein the phosphorous acid is freed from volatile contaminants by passing a stream of gas therethrough and the acid so treated is reacted.

3. The process as claimed in claim 1, wherein the liquid phase is maintained at a temperature within the range 300° to 350°C.

4. The process as claimed in claim 1, wherein phosphorous acid containing more than 67 weight % of $P_2O_3$, which originates from pyrophosphorous acid therein, is diluted with water so as to reduce its $P_2O_3$-content down to 67 weight %, and the acid so treated is reacted.

5. The process as claimed in claim 1, wherein the liquid phase is polyphosphoric acid containing between 80 and 85 weight % of $P_2O_5$.

6. The process as claimed in claim 1, wherein the hydrogen phosphide is scrubbed with a substance selected from group consisting of water, sodium hydroxide solution or mixtures thereof.

7. The process as claimed in claim 1, wherein the hydrogen phosphide is purified by means of active carbon.

8. The process as claimed in claim 1, wherein liquid phase and phosphorous acid are maintained in a ratio by volume of about 2:1.

9. The process as claimed in claim 1, wherein agitation is effected by means of an agitator rotating at a peripheral speed between 0.01 and 10.0 m/sec.

10. The process as claimed in claim 9, wherein the agitator is operated at a peripheral speed of about 0.1 m/sec.

11. The process as claimed in claim 1, wherein the phosphorous acid is preheated to temperatures within the range 60° to 100°C.

12. The process as claimed in claim 11, wherein the phosphorous acid is preheated to temperatures within the range 80° to 90°C.

13. The process as claimed in claim 1, wherein the reaction is carried out under inert gas.

14. The process as claimed in claim 1 wherein the process is carried on continuously and the newly formed liquid phase containing phosphoric acid is recovered at the same rate as it is being formed.

* * * * *